METHOD FOR THE SYNTHESIS OF GALLIUM PHOSPHIDE

Filed Dec. 27, 1962

INVENTORS
JOSEPH A. KUCZA
GERALD MANDEL
BY
Sughrue, Rothwell, Mion, Zinn
ATTORNEYS.

United States Patent Office 3,301,637 Patented Jan. 31, 1967

3,301,637

METHOD FOR THE SYNTHESIS OF GALLIUM PHOSPHIDE

Joseph A. Kucza, Mount Kisco, and Gerald Mandel, New Rochelle, N.Y., assignors to International Business Machines Corporation, New York, N.Y., a corporation of New York Filed Dec. 27, 1962, Ser. No. 247,705
10 Claims. (Cl. 23—204)

The present invention relates to methods for the synthesis of gallium phosphide. More specifically, the invention relates to methods for producing gallium phosphide by catalyzing the reaction between the constituent elements of the compound, gallium and phosphorous.

It is generally known that gallium phosphide and related III–V semiconductor compounds can be synthesized by heating the elements in contact to elevated temperatures and then condensing the product thus formed. Such methods, however, have required special equipment due to the high temperatures involved. Difficulty has also been encountered in obtaining single phase products possessing the proper stoichiometric proportions of the constituents. Further difficulty has arisen due to the tendency of undesired impurity vapors to permeate the product during high temperature formation.

Accordingly, attention has been directed to the production of gallium phosphide and other III–V compounds by relatively low-temperature, low-pressure reactions. One such method is proposed in the copending application of the same assignee, Serial Number 128,558, filed August 1, 1961, by D. M. J. Compton et al, and entitled Semiconductor Compound Crystals. The present invention is an improvement over the technique described in the previously noted application.

The present invention also constitutes an improvement over the method for producing semiconductor bodies as disclosed in the copending application of the same assignee, Serial Number 59,004, filed September 28, 1960, now abandoned, by G. A. Silvey and entitled Vapor Growth of Semiconductor Compounds. The foregoing copending application relates to a vapor growth technique for producing semiconductive devices, especially junction devices, involving the halogen transport and deposition of a semiconductor compound. According to the present invention, it is possible to produce devices as described in the above-noted application but starting with the constituent elements of the compound rather than the compound itself.

Accordingly, it is an object of the present invention to provide methods for the production of gallium phosphide at relatively low temperature and pressure.

A further object of the present invention is to provide for the production of stoichiometric gallium phosphide of high purity.

Another object of the present invention is the provision of a method for producing semiconductor devices comprising the deposition of layers of crystalline gallium phosphide produced by the catalyzed reaction of elemental gallium and phosphorous.

Other objects and advantages of the present invention will be apparent to those skilled in the art in view of the following detailed description and the accompanying drawing which illustrates a preferred method for carrying out the invention.

In general, the present invention is based upon the discovery that the reaction between gallium and phosphorous at 800° C. is catalyzed by the presence of phosphorous trichloride, $PCl_3$. Even at elevated temperatures, gallium metal remains in the liquid state, and this inhibits the rate of reaction between the gallium and the phosphorous vapors. However, by the addition of $PCl_3$, the reaction may be greatly accelerated.

While the mechanism of the reactions involved is not fully understood and there is no intention that the invention be limited by this explanation, it is theorized that the gallium phosphide is produced according to the following reactions which are complete or displaced to the right at 800° C.:

$$(1)\quad Ga_{(l)}+PCl_{3(g)}\rightleftharpoons \tfrac{1}{2}Ga_2Cl_{6(g)}+\tfrac{1}{4}P_{4(g)}$$

$$(2)\quad Ga_2Cl_{6(g)}+P_{4(g)}\rightleftharpoons 2GaP_{(s)}+2PCl_{3(g)}$$

Addition of reactions (1) and (2) gives the following reaction:

$$(3)\quad Ga_{(l)}+\tfrac{1}{4}P_{4(g)}+PCl_3\rightleftharpoons 2GaP_{(s)}+PCl_3$$

After the reaction is completed, $PCl_3$ is removed from contact with the product GaP before cooling to prevent reaction between GaP and $PCl_3$ which occurs at lower temperatures.

It has also been found that GaP, formed according to the above reaction, may be transported in the vapor state from the hot zone of formation to a cooler zone and there deposited as a crystalline solid.

Spectrographic analysis of the product has confirmed that it is high purity, single phase, approximately stoichiometric gallium phosphide.

Figure 1:
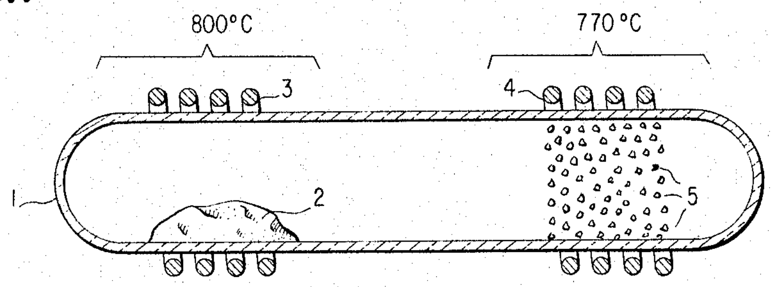
FIGURE 1 is a side sectional view of apparatus for carrying out the reaction of the present invention.

Referring to the drawing, the apparatus in FIGURE 1 comprises a reaction chamber 1 which may, for example, be a closed quartz tube.

A charge of gallium and phosphorous 2 preferably in finely divided form and in stoichiometric proportions is introduced into the tube. A small amount of phosphorous trichloride is also introduced with charge 2.

The chamber 1 is evacuated and sealed according to standard practice and the chamber is then heated by resistance coils 3 and 4 which encircle the tube or by other suitable heating means. The temperature in the vicinity of charge 2 is brought to about 800° C. by coil 3 at which temperature reaction takes place at a rapid rate. The end of the chamber encircled by coil 4 is maintained at a slightly lower temperature, approximately 770° C., and the vaporous reaction product from charge 2 condenses at the cooler end of the chamber.

In accordance with the theory previously advanced, it is believed that the liquefied gallium first reacts with the phosphorous trichloride to form gaseous gallium hexachloride, reaction (1). The gallium hexachloride in turn reacts with phosphorous vapors to yield gallium phosphide which condenses to a solid at the cooler end of the chamber, reaction (2).

The chamber 1 is then evacuated to remove $PCl_3$ and is cooled. After cooling, the gallium phosphide 5 may be removed from the chamber.

Figure 2:
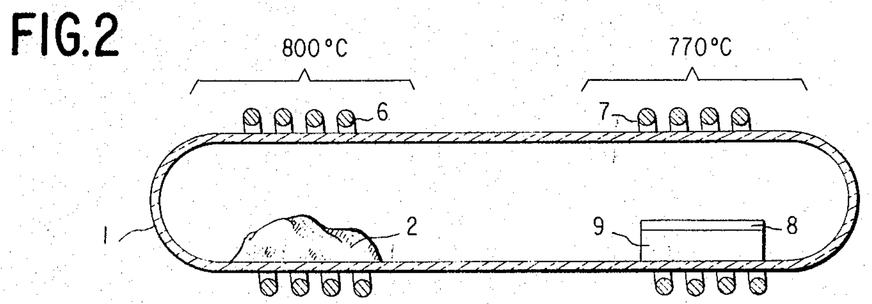
FIGURE 2 is a side sectional view of apparatus for depositing crystalline layers of gallium phosphide according to the present invention.

As illustrated in FIGURE 2 of the drawing, another important embodiment of the invention comprises the application of the present method to the production of films or layers of gallium phosphide, especially in the fabrication of semiconductor devices. In the apparatus shown, a charge 2 of gallium and phosphorous in finely divided form and in stoichiometric proportions is placed in evacuated chamber 1 which may be a tube of the type described in connection with FIGURE 1. Phosphorous trichloride, a liquid at room temperature, may be added with the charge 2 or may be separately introduced as a gas, after evacuation of the chamber and preferably after the chamber has been heated to a temperature above the boiling point of phosphorous trichloride, about 76° C.

The gallium and phosphorous are then heated by coil 6 in the presence of the phosphorous trichloride to a temperature of about 800° C. to generate gallium phosphide. The gallium phosphide is then deposited as an epitaxial layer 8 on a germanium substrate 9 which is positioned in a portion of the chamber which is maintained at a lower temperature, about 770° C., by coil 7.

Thus, where the substrate 9 is a body of semi-conductive material, such as germanium, a junction can be formed by condensing a layer of gallium phosphide on the surface. The technique is also readily adaptable to the deposition or growth of monocrystalline films of gallium phosphide on various substrates.

In all embodiments of the invention, the charge 2 of gallium and phosphorous need not be mixed, but can be separately placed as shown in the above-noted copending application Serial Number 128,558.

Figure 3:
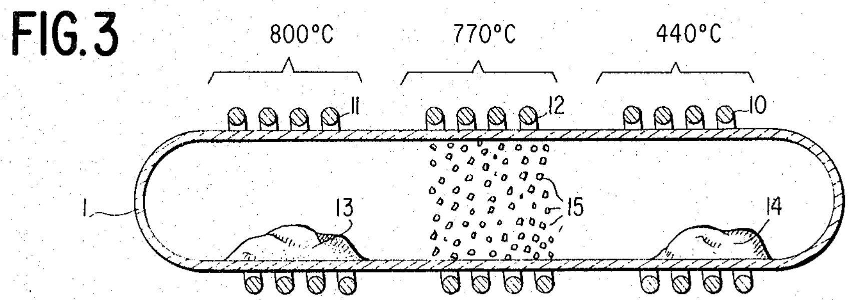
FIGURE 3 is a side sectional view of another form of apparatus for carrying out the invention.

If, as shown in FIGURE 3, the gallium and phosphorous are introduced as separate charges 13 and 14 respectively, the manner of heating may be modified. Thus, coil 10 is employed to heat chamber 1 in the vicinity of the phosphorous 14 to a temperature of about 440° C., sufficient to vaporize the phosphorous, and coil 11 heats the chamber in the vicinity of the gallium 13 to about 800° C. The phosphorous trichloride may be added with the phosphorous or gallium or separately, in either liquid or gaseous form.

As in the embodiment shown in FIGURE 1, the gallium phosphide product 15 is condensed in a portion of the chamber maintained at about 770° C. by coil 12.

While the preferred temperature for carrying out the present reaction is 800° C., it is possible to conduct the reaction over the range of from 500° C. to 1000° C. Likewise, the temperature of the condensation zone or the substrate on which the gallium phosphide is deposited may also be varied over the range of from 500° C. to 1000° C., although a temperature of about 770° C. is preferred. Below 500° C. there is a tendency for the gallium phosphide to react with the phosphorous trichloride.

Only a small amount of phosphorous trichloride is required to catalyze the reaction. The amount may be varied over a fairly wide range, generally from about 0.01 to 0.2 mole per mole of gallium or phosphorous. Preferably about .1 mole per mole of gallium or phosphorous is employed.

The following example of the manner in which the present invention may be practiced will assist toward a better understanding of the principles involved.

*Example I*

In one end of a 400 cc. volume quartz tube reaction chamber of the type illustrated in FIGURE 1, there are placed the following reactants:

1.12 gms. Ga—0.016M
.50 gms. P—0.016M
.22 gms. $PCl_3$—0.0016M

The chamber is then evacuated and the end in which the reactants are positioned is heated to 800° C. for 24 hours.

During this period, gallium phosphide is formed and deposited at the end of the chamber away from the reactants which is maintained at a temperature of about 770° C.

The chamber is then evacuated and cooled to room temperature. The gallium phosphide is then recovered from the chamber. Spectrographic analysis confirms that the product is approximately stoichiometric gallium phosphide.

*Example II*

The same reaction is conducted as described in Example I except that a body of garmanium is positioned in the cooler end of the tube and the gallium phosphide is deposited as a layer on the garmanium.

*Example III*

The same reaction is conducted as described in Example I except that the phosphorous and gallium are separately positioned in the chamber, as illustrated in FIGURE 3. The phosphorous trichloride is added with the gallium. The phosphorous is heated to 440° C. and the gallium to 800° C. The product is again condensed at 770° C.

It will be apparent that various changes may be made in the foregoing invention affecting the character of the apparatus in which the method is practiced, the reaction conditions, the form of the materials, the recovery of the product and the like, but such changes may be made by those skilled in the art without departing from the spirit and scope of the present invention.

What is claimed is:

1. A method for producing gallium phosphide by reacting finely divided gallium and phosphorous in the presence of phosphorous trichloride as a catalyst.

2. The method of claim 1 wherein the temperature at which the gallium and phosphorous are reacted as in the range of from 500° C. to 1000° C.

3. A method for producing gallium phosphide as in claim 1 wherein stoichiometric amounts of gallium and phosphorous are reacted at approvimately 800° C.

4. A method for producing gallium phosphide as in claim 1 and then condensing the gallium phosphide at a temperature below 800° C.

5. A method for producing gallium phosphide as in claim 1 wherein the phosphorous trichoride catalyst is present in an amount of from 0.01 mole to 0.2 mole per mole of gallium.

6. A method for producing gallium phosphide as in claim 4 wherein following the condensing of the gallium phosphide the residual phosphorous trichloride is removed from contact with the condensed gallium phosphide and then the gallium phosphide is cooled below 500° C.

7. A method for producing a gallium phosphide film on a substrate comprising reacting stoichiometric amounts of gallium and phosphorous in the presence of a phosphorous trichloride catalyst at a temperature of approximately 800° C. to produce vapors of gallium phosphide and then condensing said vapors upon said substrate with said substrate being maintained at a temperature below 800° C.

8. The method of claim 7 wherein the substrate is a body of semi-conductive material.

9. The method of claim 7 wherein the reaction temperature is maintained at a temperature in the range of from 500° C. to 1000° C. and the substrate is maintained below this temperature.

10. The method of claim 8 in which said gallium phosphide is deposited as a film by being epitaxially grown on a body of germanium substrate.

References Cited by the Examiner

UNITED STATES PATENTS

| | | | |
|---|---|---|---|
| 2,850,414 | 9/1958 | Enomoto | 252—62.3 |
| 2,938,816 | 5/1960 | Gunther | 23—204 |
| 3,094,387 | 6/1963 | Williams | 23—204 |

OSCAR R. VERTIZ, *Primary Examiner.*

H. S. MILLER, *Assistant Examiner.*